UNITED STATES PATENT OFFICE.

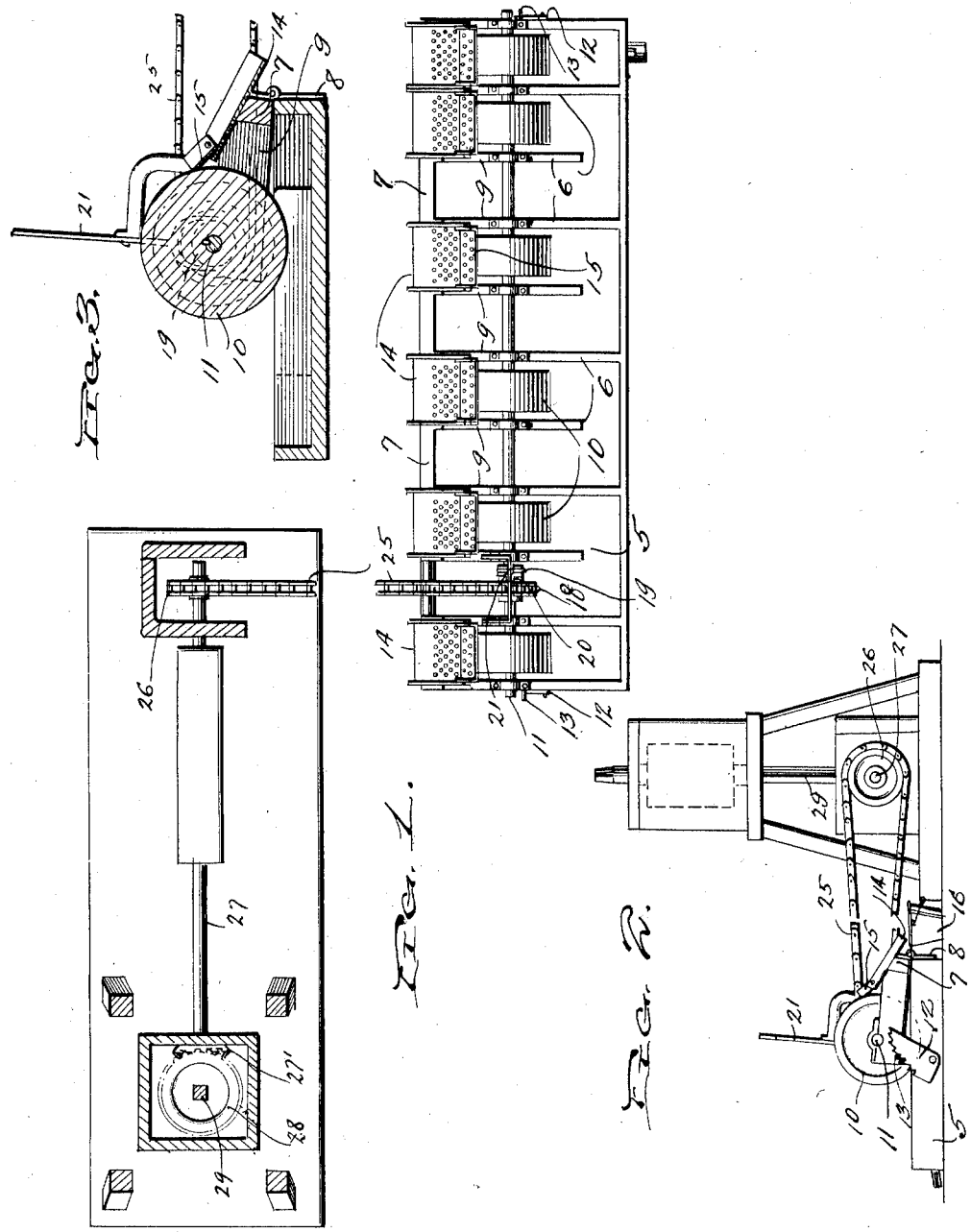

EPHRIAM B. POOLE, OF CORDOVA, ALABAMA.

EVAPORATING-PAN AND SKIMMER.

1,385,393.

Specification of Letters Patent.　Patented July 26, 1921.

Application filed October 7, 1919. Serial No. 329,172.

*To all whom it may concern:*

Be it known that I, EPHRIAM B. POOLE, a citizen of the United States, residing at Cordova, in the county of Walker, State of Alabama, have invented certain new and useful Improvements in Evaporating-Pans and Skimmers; and I do hereby declare the following to be a full, clear, and exact description of the invention, such as will enable others skilled in the art to which it appertains to make and use the same.

This invention relates to evaporators and skimmers, the object of the invention being to provide an apparatus in which in connection with an evaporating pan to contain the material to be treated, there is employed means for skimming the material in its passage through the pan, and means for returning to the pan such material of value as may be extracted from the skimmings. A further object of the invention is to provide an apparatus that may be adjusted to vary the dip of the skimming members to suit the particular material treated, the same adjusting means serving to suit the apparatus to different depths of material in the pan.

Other objects and advantages of the invention will be understood from the following description.

In the drawings:

Figure 1 is a top plan view showing an apparatus embodying the present invention.

Fig. 2 is an end view of the apparatus with the skimming wheels raised slightly above their lowermost relation to the evaporating pan.

Fig. 3 is a section taken vertically and transversely through the evaporating pan, the section including one of the skimming wheels and the screen chute into which the skimmings are discharged.

Referring now to the drawings, there is shown an evaporating pan 5, having the transverse partitions 6 that stand vertically therein and project alternately from opposite sides, they being thus in staggered relation with a resultant circuitous passage through which the material treated, circulates from end to end of the pan, as is usual.

At one side of the pan 5 and extending longitudinally of it, is a carrying frame, including the longitudinal member or beam 7, that is hinged for movement into and out of position upon the corresponding side of the pan, the hinges of the beam, as shown at 8, being connected directly to this side of the pan. The frame includes also the arms 9, that extend laterally from the beam and which are adapted to rest, each upon a partition 6, when the frame is at the lower limit of its hinged movement.

During the evaporating process, more or less of a scum collects upon the surface of the material in the pan and to remove this scum continuously during the process, a plurality of flat faced skimming wheels 10 are provided, and which are carried by a shaft 11, having bearings in the arms 9. These skimming wheels 10, may be provided, one for each transversely extending portion of the circuitous passage of the pan or one for every other such section, or whatever other number of wheels may be determined as desirable.

When the carrying frame is at the lower limit of its adjustment, the skimming wheels reach to near the bottom of the pan and in order to support the frame with the wheels in successive raised positions, rack plates 12 are pivoted against the outer faces of the ends of the pan to engage the pins 13 that project from the endmost arm 9. By shifting these rack plates, they may be positioned to receive the pins 13 in different notches, to support the frame with the skimming wheel at correspondingly different elevations, as will be understood. Thus, the skimming wheels may be set to correspond to different depths of material being processed, or to dip to different depths, as may be desired to suit different specific conditions.

In connection with each skimming wheel 10, there is employed a shed trough that includes a lower member 14 and an upper member 15. The member 14 has its side edge portions turned upwardly and imperforate, as is also the lower-end portion of the member that is secured upon the beam 7. The portion of the member 14 extending forwardly of the beam 7 and overhanging the pan 5, is perforated. The upper member 15 of each shed trough also has its side portions turned upwardly and it is disposed with its lower imperforate end portion upon the member 14 and between the upturned sides of the latter, the upper-end portion of the member 15, being perforated. The upturned sides of the member 15, are pivoted to the upturned sides of the member 14, so that the upper edge of the member 15 may rest snugly against the flat periphery of the corresponding skimming wheel and thus insure shedding from the wheel of the scum that is lifted from the pan upon it. The upper face of the beam 7 is beveled so that the members 14 secured upon it will be held inclined to insure gravitation of the scum over them for discharge beyond the pan to receptacles 16 that are disposed to receive it.

The skimmer wheel shaft 11, is driven at times through the medium of a sprocket wheel 18, that is disposed loosely upon it, there being a clutch member 19 splined upon the shaft and movable into and out of engagement with the clutch face 20, formed on the corresponding end of the sprocket wheel. Movement of the clutch member is effected by means of a shift lever 21, that is conveniently pivoted, as illustrated.

It will thus be seen that during the evaporating process the scum may be removed from the material undergoing treatment and discharged to convenient receptacles, the skimmers being adjustable to suit the work in hand and the shedders being at all times active, while the liquid to be saved from the skimmings, drains through the perforations of the shedders and back into the pan.

The driving mechanism that is employed for the sprocket wheel 18, includes a chain 25 that leads to a sprocket wheel 26, fixed to a shaft 27, that is suitably journaled in horizontal position and has a beveled gear 27 that meshes with a similar gear 28 on a vertical shaft 29. The shaft 29 may be power driven or may be operated in any other desired manner.

What is claimed is:

1. The combination with an evaporating pan, of a skimming wheel rotatably mounted to dip into the pan, a shed trough comprising a section in fixed relation to the wheel and projecting beyond the side of the pan and a section pivoted to the first section and disposed in contact with the periphery of the wheel and to discharge to the first section, and means for rotating the wheel.

2. The combination with an evaporating pan, of a skimming wheel rotatably mounted and adjustable to dip into the pan to different depths and a trough comprising a member in fixed relation to the wheel and extending over the pan and exterior to it and a second member pivotedly mounted and disposed to receive from the wheel and discharge to the first member.

3. The combination with an evaporating pan, of a carrier frame hinged thereto, a shaft mounted in the frame and movable therewith toward and away from the top of the pan, a plurality of skimming wheels carried by the shaft, means for holding the frame at different points of its adjustment, and a shedding trough for each wheel comprising a member having a perforated portion overhanging the pan and a member pivotally connected with the first member and disposed to receive skimmings from the wheel and discharge it to the first named member.

In testimony whereof, I affix my signature, in the presence of two witnesses.

EPHRIAM B. POOLE.

Witnesses:
B. F. BORDEN,
O. C. LAMBERT.